Sept. 16, 1969     D. S. STRADER     3,466,868

EXHAUST GAS CONDITIONER

Filed Feb. 23, 1968     2 Sheets-Sheet 1

INVENTOR.
DON S. STRADER
BY
*C. Harvey Gold*
HIS ATTORNEY

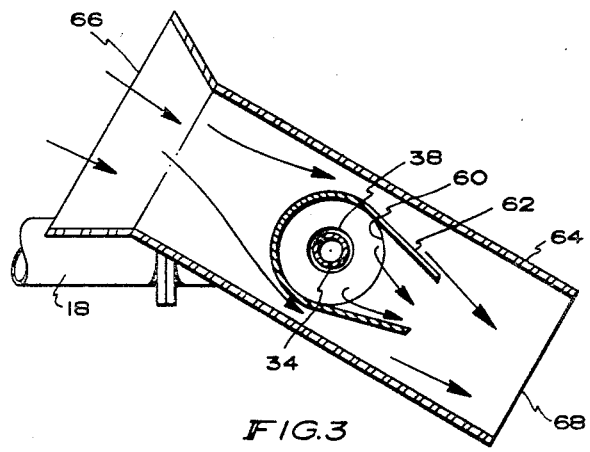
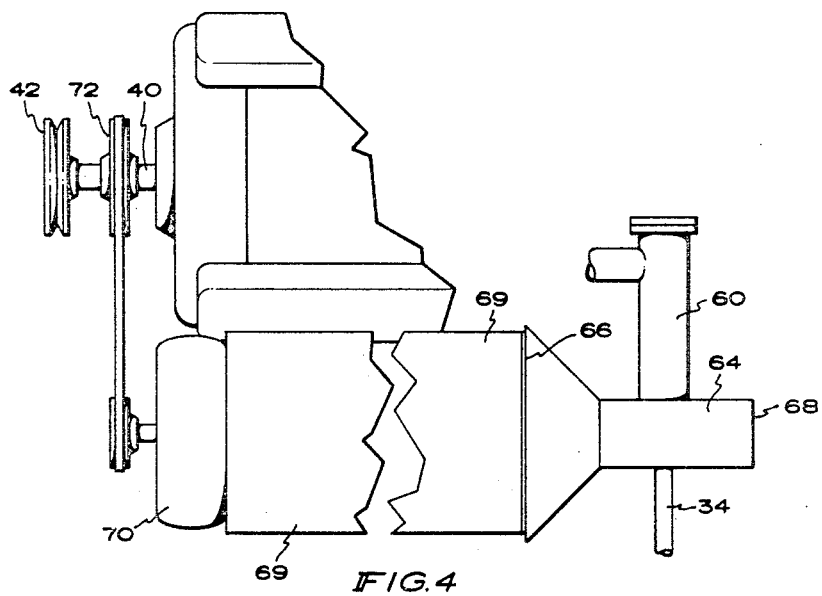

United States Patent Office 3,466,868
Patented Sept. 16, 1969

3,466,868
EXHAUST GAS CONDITIONER
Don S. Strader, Salt Lake City, Utah, assignor to Envirotech Corporation, Salt Lake City, Utah, a corporation of Delaware
Continuation-in-part of application Ser. No. 613,542, Feb. 2, 1967. This application Feb. 23, 1968, Ser. No. 707,868
Int. Cl. F01n 1/14
U.S. Cl. 60—30
3 Claims

ABSTRACT OF THE DISCLOSURE

A gas conditioner for treating exhaust from internal combustion engines, the conditioner including a contact chamber for receiving engine exhaust gases, means for injecting fluid spray into gases in the chamber, an elongated open-ended dilution chamber, a gas discharge nozzle inside the dilution chamber directed axially thereof toward one open end, and conduit means for conducting gas from the contact chamber to the nozzle for injection axially of the dilution chamber to induce the flow of fresh air into and through the chamber to act as a diluent for the exhaust gases. The air flow may be augmented by flaring the dilution chamber inlet and/or by forcing air into the dilution chamber. The rate of supply of either or both the scrubbing liquid and diluent air may be controlled to vary in direct proportion to engine speed to accommodate variations in gas flow rate and temperature.

CROSS-REFERENCE TO RELATED APPLICATION

This application is a continuation-in-part of my copending United States patent application Ser. No. 613,-542, filed Feb. 2, 1967, now abandoned.

BACKGROUND OF THE INVENTION

This invention relates generally to apparatus for conditioning the exhaust gases from internal combustion engines to cleanse, dilute and cool them before final discharge.

The invention is of particular application in closely confined operations, such as underground mining, where clean, cool and relatively dilute exhaust is required for reasons of health and safety.

In the usual gas conditioners heretofore employed, gases are scrubbed in a water spray. Such devices, while useful, are only partially successful in that they do no more than scrub the gases with partial cooling thereof. In the apparatus covered in my copending application increased scrubber efficiency is provided by a system in which the volume of scrubber water injected into the gas varies directly with the rate and temperature of the exhaust gases. This has been extremely successful, however, the gases, although scrubbed and somewhat cooled are undiluted hence unpleasant and often too warm for safety and comfort.

SUMMARY OF THE INVENTION

This invention provides apparatus for conditioning such gases prior to exhaust by treating a continuously flowing stream thereof in successive steps to effect scrubbing in a fluid spray followed by dilution with concomitant cooling.

In its broadest form the invention comprises a contact chamber for receiving exhaust gases, means for injecting fluid spray into said chamber into contact, preferably countercurrently, with gases flowing therethrough, an elongated open-ended dilution chamber which may be tubular, a gas discharge nozzle mounted in said chamber intermediate its inlet and outlet and directed axially thereof toward the outlet end, said nozzle being spaced from the chamber sidewall to enable gas flow through the chamber, and means connecting the contact chamber with said nozzle for injection of gases axially into the dilution chamber and outwardly thereof through said outlet whereby to induce gas flow from said inlet into and through the dilution chamber concurrently with said exhaust gases.

In a preferred embodiment, means are provided whereby the liquid spray is injected into the contact chamber at a varying rate directly proportional to the engine speed and the resulting flow rate and temperature of the exhaust gases.

In another special modification, a blower is provided adjacent the dilution chamber inlet for forcing air through the chamber to increase dilution. In some cases, the diluent may be introduced at a rate sufficient to create a pumping action to draw exhaust gases from the engine rather than vice versa.

So that the invention may be more readily understood and carried into effect, reference is made to the accompanying drawings which are offered by way of example only and are not to be taken as limiting the invention, the scope of which is defined by the appended claims which are intended to embrace equivalent structures.

BRIEF DESCRIPTION OF THE DRAWINGS

FIG. 3 is a sectional view taken in the plane of line 3—3 of FIG. 2 looking in the direction of the arrows.

FIG. 4 is a partial top view of apparatus embodying a particular modification of the invention in which means are provided for supplying a controlled pressured flow of diluent gas to the dilution chamber to accommodate special conditions.

DESCRIPTION OF THE PREFERRED EMBODIMENTS

Figure 1:
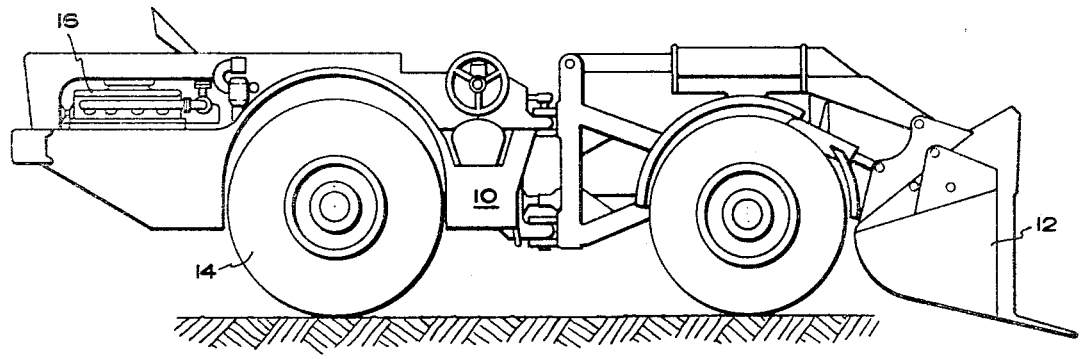
FIG. 1 is a side elevational view of a mining machine embodying the invention.

FIG. 1 is an illustration of a mining machine 10 in which the bucket 12 and traction wheel 14 are driven by a piston-type internal combustion engine 16. Engine exhaust gases discharge into manifolds 20 and 22 thence flow through conduits 24 and 26 and a common exhaust pipe 18 into the gas conditioner of the invention.

Figure 2:
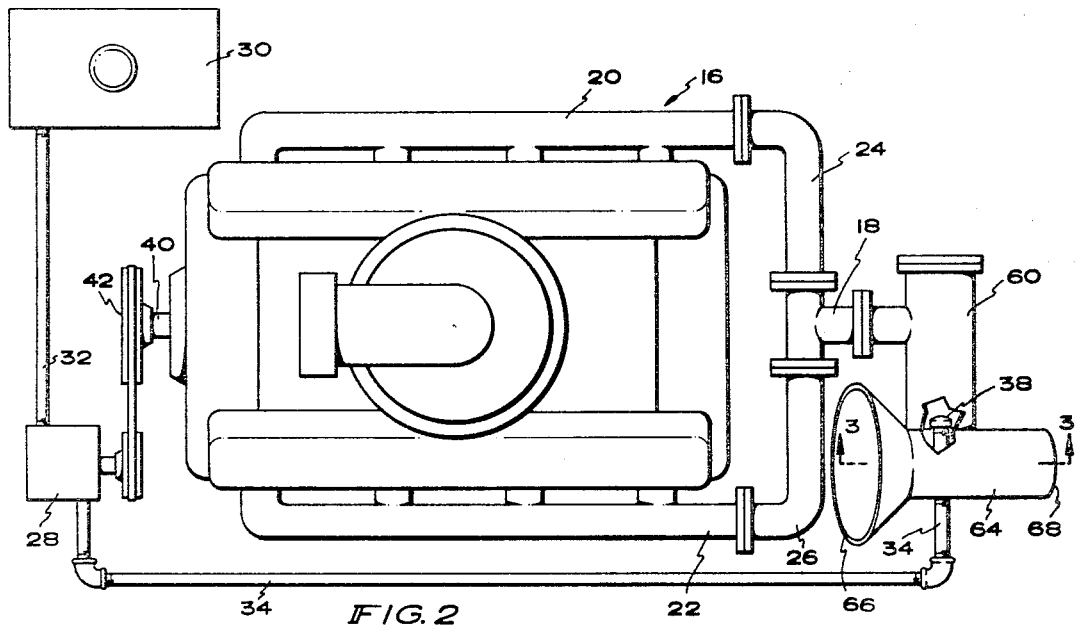
FIG. 2 is a top view of an eight cylinder internal combustion engine equipped with the gas conditioner of this invention, a portion being cut away for purposes of clarity.

As best seen in FIGS. 2 and 3, the gas conditioner includes a contact chamber 60, a spray nozzle 38, a tubular dilution chamber 64 and a nozzle 62 for injecting gases axially into the dilution chamber.

Gases from the exhaust pipe 18 are first received in contact chamber 60 where they mix with a countercurrently directed spray of conditioning liquid, usually water, discharged from a nozzle 38 mounted in the chamber. As shown, the liquid is supplied from a reservoir 30 via a pump 28 and suitable conduits 32 and 34.

As engine speed increases so do the discharge rate and temperature of its exhaust gases and it is necessary to supply conditioning liquid at a proportionately increased rate. This is conveniently accomplished by means of a variable output pump that is belt driven from a pulley 42 mounted directly on the engine crank shaft 40. The pump capacity or output varies with its speed so that with this arrangement, the quantity of scrubbing liquid sprayed into the contact chamber varies directly with the engine speed.

The contact chamber communicates with a discharge nozzle 62 located in the dilution chamber 64. The nozzle is spaced from the chamber side wall to permit gas flow completely through the chamber and is directed axially toward the chamber outlet 68 so that exiting exhaust gases will induce the flow of outside air through the inlet 66 into the chamber to mix the exhaust gases. The quantity of diluent gas drawn into the chamber will automatically vary directly with the rate of flow of exhaust gases from the nozzle. In the usual case this automatic action is sufficient for all operations.

The inflow of fresh air to the dilution chamber is enhanced by flaring the inlet end 66 to the chamber as illustrated in FIG. 2. Also, the inlet may be positioned to receive the positive air stream generated by the engine cooling system. In special cases it may be desirable to employ the embodiment illustrated in FIG. 4 to provide a positive pressured stream of diluent.

As illustrated in FIG. 4, a pressured air stream is directed through the dilution chamber by blower 70 that is belt driven from a pulley 72 on the engine shaft and has its outlet connected to the dilution chamber inlet by a conduit 69. Thus, as engine speed increases there is a proportionate increase in the quantity of diluent air supplied to the dilution chamber.

Although the invention has been described in connection with a piston engine, it is useful with any internal combustion engine, including turbines, that generate hot and/or noxious gases.

I claim:

1. Gas conditioning apparatus for use on internal combustion engines used in underground mining, comprising a tubular dilution chamber with an inlet and an outlet at its respective opposite ends; a contact chamber for receiving exhaust gases from said engine having a discharge end which extends into the interior of said dilution chamber between said opposite ends; pumping means for injecting a conditioning liquid into said contact chamber countercurrent to the flow of gases therethrough and at a rate directly proportional to the rate at which the exhaust gases are discharged into said dilution chamber; and a gas discharge nozzle secured to the discharge end of said contact chamber and mounted in said dilution chamber in a spaced relationship with the sidewalls thereof and directed axially of said dilution chamber towards said outlet whereby exhaust gases from said engine are injected axially of said dilution chamber to discharge from said outlet to induce a flow of diluent air into said inlet and through said dilution chamber concurrently with said exhaust gases.

2. Apparatus according to claim 1 in which said pumping means for injecting conditioning liquid into said contact chamber includes a reservoir, a pump of capacity variable directly with its speed, a spray nozzle directed into said contact chamber, a conduit interconnecting said reservoir said pump and said nozzle, and means for driving said pump at a speed directly proportional to the rate at which gases are discharged from said gas discharge nozzle in said dilution chamber.

3. Apparatus according to claim 2 with the addition of a blower for supplying diluent air to said inlet end of said dilution chamber at a rate directly proportional to the rate at which the exhaust gases are discharged into said dilution chamber.

References Cited

UNITED STATES PATENTS

| 2,667,031 | 1/1954 | Ryder | 60—30 |
| 2,984,967 | 5/1961 | Caddell | 60—30 |
| 3,132,474 | 5/1964 | Fox | 60—30 |
| 3,282,047 | 11/1966 | Wertheimer | 60—30 |
| 3,353,335 | 11/1967 | Caballero | 60—30 |

CARLTON R. CROYLE, Primary Examiner

DOUGLAS HART, Assistant Examiner